United States Patent
Soudais et al.

(10) Patent No.: US 8,470,117 B2
(45) Date of Patent: Jun. 25, 2013

(54) METHOD OF MANUFACTURE FOR A FLEXIBLE PACKAGING FILM WITH RECLOSURE

(75) Inventors: Stephane Soudais, Nettetal (DE); Gyula Madai, Budapest (HU); Stefan Zoister, Perg (AT)

(73) Assignee: Mondi AG (AT)

( * ) Notice: Subject to any disclaimer, the term of this patent is extended or adjusted under 35 U.S.C. 154(b) by 110 days.

(21) Appl. No.: 12/993,410

(22) PCT Filed: Feb. 23, 2010

(86) PCT No.: PCT/EP2010/052297
§ 371 (c)(1),
(2), (4) Date: Feb. 14, 2011

(87) PCT Pub. No.: WO2010/112271
PCT Pub. Date: Oct. 7, 2010

(65) Prior Publication Data
US 2011/0147383 A1    Jun. 23, 2011

(30) Foreign Application Priority Data
Apr. 3, 2009   (EP) .................................. 09157316

(51) Int. Cl.
*B32B 37/00* (2006.01)
*B32B 37/02* (2006.01)
*B32B 38/00* (2006.01)
*B32B 38/04* (2006.01)

(52) U.S. Cl.
USPC ........... 156/256; 156/250; 156/252; 156/253; 156/257

(58) Field of Classification Search
USPC .......................... 156/250, 252, 253, 256, 257
See application file for complete search history.

(56) References Cited

U.S. PATENT DOCUMENTS

| 4,260,061 A * | 4/1981 | Jacobs ........................ 383/203 |
| 4,673,601 A | 6/1987 | Lamping et al. |
| 4,840,270 A * | 6/1989 | Caputo et al. ................ 206/205 |
| 5,620,550 A * | 4/1997 | Andersson et al. ........... 156/252 |

FOREIGN PATENT DOCUMENTS

| DE | 40 07 649 | 9/1991 |
| EP | 0 447 636 | 9/1991 |

OTHER PUBLICATIONS

English Translation of International Search Report and Written Opinion.

* cited by examiner

*Primary Examiner* — Mark A Osele
*Assistant Examiner* — Christopher C Caillouet
(74) *Attorney, Agent, or Firm* — Ostrolenk Faber LLP (57) ABSTRACT

In a method of manufacture for a packaging film, a pour-hole film strip is supplied to a film web and with its film strip sealing layer is attached to that side of the film web which, when the packaging film is used as prescribed, forms a film inner side of the packaging so that a tensile force can be transmitted via a pull tab in the packaging film to a separating region in the film strip sealing layer and said separating region and an adjoining region of an adhesive layer form a reclosure cooperating with the pull tab.

11 Claims, 5 Drawing Sheets

METHOD OF MANUFACTURE FOR A FLEXIBLE PACKAGING FILM WITH RECLOSURE

CROSS-REFERENCE TO RELATED APPLICATION

The present application is a 35 U.S.C. §371 national phase conversion of PCT/EP2010/052297 filed Feb. 23, 2010, which claims benefit and priority of European Patent Application No. 09157316.2 filed Apr. 3, 2009, both incorporated herein in their entirety.

TECHNICAL FIELD

The invention relates to a method of manufacture for a flexible packaging film with reclosure.

The invention further relates to a packaging film which was produced according to the method of manufacture mentioned initially, as well as a packaging produced with the aid thereof and use thereof on a bag machine.

The invention further relates to a pour-hole film strip which is used in said method of manufacture of said packaging film.

BACKGROUND

In many areas of the packaging industry, there is a need for a packaging having a reclosure, which allows repeated opening or reclosing in order to remove goods stored in the package, for example, in portions and store sealed after the first opening. Such a package is known, for example from the patent application WO 2005/123535A1. The packaging described there has a pressure-sensitive adhesive label attached to the outer side of the packaging adjacent to that region at which the packaging is opened, as a reclosure.

This solution is presented as relatively disadvantageous in WO 2005/123535A1 and in order to avoid the problems discussed with this, a different solution is proposed in which no additional label is used but the reclosure is realized directly by the packaging film of the packaging. In this realization a zone is formed in the packaging film in which two adjacent layers are interconnected by a pressure-sensitive adhesive. The packaging can be repeatedly opened and closed along this zone. The reclosure is therefore integrated in the packaging film.

However, this solution is also beset by disadvantages inherent to the design because, for example, the loading capacity of the packaging film or its dimensional stability in the area of the opening of the packaging is limited by the mechanical parameters of the packaging film and the opening itself constitutes a mechanical interference of the structure of the packaging film. In particular, the handling of the reclosure has proved to be problematical because the packaging can become severely deformed in the area of its opening due to the pulling effect on the reclosure—i.e. when opening the reclosure. On the other hand, the closing of the reclosure can sometimes be difficult if the packaging is severely deformed in the area of its opening.

It is therefore an object of the present invention to further develop a method of manufacture for a flexible packaging film and such a packaging film of the type specified initially for a use in a packaging or for a use in a bag machine and to provide a pour-hole film strip so that the aforesaid disadvantages are obviated.

SUMMARY OF THE INVENTION

The object is achieved by a method of manufacture, by a packaging film, by a packaging, by use of such packaging, by use of such packaging film, and by a pour-hole film strip, as disclosed herein.

According to the invention, a method of manufacture for a packaging film comprises the process steps specified hereinafter, i.e. supplying a film web along a running direction and producing a first material weakening defining a pull tab in the film web at a pull tab position, and supplying a pour-hole film strip, which pour-hole film strip has at least a three-layer structure, wherein the at least three-layer structure defines at least one pour hole and wherein the at least three-layer structure comprises a film strip sealing layer and an adhesive layer situated adjacent to the film strip sealing layer, and a carrier film layer situated adjacent to the adhesive layer on the side of the adhesive layer facing away from the film strip sealing layer, wherein the film strip sealing layer realizes a predetermined breaking layer, which is constituted in such a manner that under the action of a tensile force on a separating region of this predetermined breaking layer at least partially surrounding the pour hole, a break propagates along an edge of the separating region in the predetermined breaking layer, and attaching the pour-hole film strip with the film strip sealing layer to that side of the film web, which, when the packaging film is used as prescribed, forms a film inner side of a packaging so that said action of tensile force can be transmitted via the pull tab to the separating region and said separating region and the adjoining region of the adhesive layer form a reclosure cooperating with the pull tab.

Furthermore, a packaging film according to the invention is characterized in that it was produced by the method of manufacture according to the invention. In addition, a packaging according to the invention comprises a packaging film produced by the method of manufacture according to the invention. In addition, such a packaging film according to the invention is used on a bag machine which is configured to form a flexible bag from the packaging film.

Furthermore, a pour-hole film strip according to the invention has an at least three-layer structure, which at least three-layer structure defines at least one pour hole, wherein the at least three-layer structure comprises a film strip sealing layer and an adhesive layer situated adjacent to the film strip sealing layer, and a carrier film layer situated adjacent to the adhesive layer on the side of the adhesive layer facing away from the film strip sealing layer, wherein the film strip sealing layer realizes a predetermined breaking layer, which is constituted in such a manner that under the action of a tensile force on a separating region of this predetermined breaking layer at least partially surrounding the pour hole, a break propagates along an edge of the separating region in the predetermined breaking layer.

A "film web" is to be understood as a continuous film, which, for example, is unrolled from a roll and thus made accessible to the manufacturing process. However, it can also comprise ready-cut film web sections which are sequentially made accessible at the beginning of the manufacturing process. The film web preferably has a composite film structure. However, it can also be configured to be single-layer. In both cases, the "packaging film" produced by the method of manufacture is obtained by combining with the pour-hole film strip.

Such a packaging film can, for example, form a flexible reclosable lid of a bowl, that is realize only a component of a packaging or it can in its entirety form, for example, a flexible reclosable bag by suitable folding and sealing at its edges.

The term "running direction" is substantially to be understood as the global or area-by-area direction of movement of the film web during the manufacturing process or between the process steps.

The "material weakening" can, for example, preferably be produced by laser action so that, for example, on the respective side the packaging film or the pour-hole film strip material is removed as far as a certain depth and the thickness of the material is varied there in relation to adjacent regions. Embossing techniques or scoring techniques can also be used for this purpose, in which case, particularly with a view to the aesthetics of the film, the thickness of the respective material is not completely penetrated in this case. However, if the aesthetics are not important, the respective material can also be completely separated. The material weakening can be differently configured. For example, continuous lines can be implemented. However, interrupted lines or points can also be implemented. Mixed structures are also covered in the present context.

The supply of the pour-hole film strip can take place, for example, in a piecewise manner from a magazine or in a continuous manner such as, for example, by unrolling a rolled-up tape. The direction of the supply can also be different. As typical examples, mention is only made here of the supply of the film web, for example, from above or the supply of the film web from the side.

The film strip sealing layer of the pour-hole film strip has the material property that it can be applied as simply and permanently as possible to the film web or more precisely to that side of the film web, which, when the packaging film is used as prescribed, forms the inner side of the packaging produced with the aid of the packaging film. The film strip sealing layer can be fabricated, for example, from a low density polyethylene (LDPL) or a medium density polyethylene (MDPL), which also allows tearing of this layer, and even without an explicit material weakening. In technical jargon, this layer or this type of film is therefore also designated as "easy tear". Typically the packaging film has a sealable layer on this inner side which has material properties similar or identical to the film strip sealing layer.

The attaching typically comprises sealing the film strip sealing layer with the corresponding layer of the film web. Such sealing can be achieved, for example, by cold or heat sealing. In cold sealing, an adhesive is used, where the adhesive force of this adhesive must be substantially greater than that of the adhesive used in the adhesive layer of the pour-hole film strip. In heat sealing adjacent film regions are fused to one another.

In the adhesive layer, use is made of an adhesive which adheres both to the material of the at least three-layer structure of the pour-hole film strip facing the carrier film layer and also to the material of the at least three-layer structure facing the film strip sealing layer, and allows repeated release and readhesion of these two materials or layers. The adhesive therefore has the property that it substantially retains is peelability when the reclosure is repeatedly actuated. Substances used here for example are synthetic rubber, acrylic ester, or other, e.g. hot-melting adhesives—so-called "hot-melts".

The carrier film layer forms the base on which the further layers of the at least three-layer structure of the pour-hole film strip are constructed. Polyester (PET) having a thickness of 23-100 µm, for example, can be used as the material for this, which also contributes to the requisite stiffness. In many case, the structure of the pour-hole film strip will comprise precisely three layers, i.e. the carrier film layer and the film strip sealing layer and the adhesive layer embedded therebetween.

These layers are therefore directly "adjacent" to one another, i.e. abutting against one another. However, it can also be the case that further material or film layers, e.g. which contribute to increasing the stiffness of the pour-hole film strip can be provided, the position of which in relation to the adhesive layer can be localized on one side and on the other side of the adhesive layer. These additional layers can also be configured to be surface-covering or local such as, for example, frame-shaped or grid-shaped. The film strip sealing layer and/or the carrier film layer are then not localized directly "adjacent" to the adhesive layer but separated from the adhesive layer by intermediate layers.

When attaching the pour-hole film strip, a join is made between the pull tab and the previously described separating region of the pour-hole film strip surrounding the pour hole so that with the aid of said pull tab, said tensile force can be exerted on this separating region and this separating region can thus be released or separated from the packaging film along the edge of said join—either in an alignment with the edge of the join or at a distance therefrom. This achieves a so-called "easy tear" property. The separating region can thus be separated extensively from a layer located thereunder or from layers of the pour-hole film strip located thereunder. The edge of the separating region usually runs inside the outer edging of the pour-hole film strip at a certain distance from the edge of the pour hole so that the separating region has a certain width between the (outer) edge of the separating region and the edge of the pour hole (inner edge of the separating region). The outer edge of the separating region can be situated in an alignment with the first material weakening or adjacent thereto.

The thickness of the released material ends with the adhesive layer or projects at least into said layer or comprises its maximum extension as far as the other layer of the at least three-layer structure of the pour-hole film strip adjoining the adhesive layer. For example, if it is important that the part of the pour-hole film strip remaining on the packaging, that is, the part not released with the pull tab, should not have any adhesive since otherwise there is a risk of contamination with the packaging material, the variants last discussed should be preferred.

The reclosure is ultimately formed by the force-transmitting cooperation of the separating region with the pull tab because, as a result of the pull tab being brought back into its initial position in conjunction with the packaging film, the adhesive layer opened previously during tearing again makes an adhesive connection between the parts of the pour-hole film strip separated by the tearing.

The orientation and position of the pour-hole film strip is in this case typically selected so that the shape of the pour hole corresponds to the shape of the pull tab to allow simple opening and reclosing.

Due to the provision of the measure according to the invention, it is advantageously achieved that a reclosure is realized in a packaging film, which on account of its multilayer structure in the area of the reclosable opening, imparts an appreciable stability to the packaging film which even far exceeds adjacent regions of the packaging film. This is achieved by integrating the pour-hole film strip with the film web in the course of the manufacturing method according to the invention. The packaging according to the invention, which ultimately was produced from a film section of the processed film web, i.e. from the packaging film, ensures that the shelf life of the contents is lengthened and any unintentional emptying of the packaging is avoided. In addition, the pour hole structure already integrated in the pour-hole film strip, which relates both to the shape of a pour hole and also to the number of holes, allows a solution adapted to the respective case of application, which is adapted to the planned portionability of the packaged product packaged with the packaging.

Accordingly, the pull tab which is produced in the film web can have any standardized shape and the respective requirement profile can be taken into account solely by adapting the substantially smaller and therefore more favorably priced pour-hole film strip. With regard to the advantages in relation to the pull tab, it should be mentioned that the region of the pour-hole film strip attached to the pull tab stabilizes this mechanically when the pull tab is opened, i.e. prevents rolling-in or the like. This effect becomes particularly important when the region of the pour-hole film strip attached to the pull tab runs in the outer periphery of the pull tab.

The reclosable packaging film thus implemented achieves a considerable cost advantage compared with conventional spout concepts and solutions based on zipper or zippered systems.

With regard to the stiffness of the perforated strip, it should be mentioned that, in addition to its stabilizing multilayer structure, the pour-hole film strip can also have one or more cross webs, which create an interrupted hole structure. Consequently, even with an integral relatively large opening of the pour hole or holes, the requisite stiffness of the packaging film is ensured in the area of the reclosure so that the adhesive layer provided for the reclosure can easily be opened and reclosed again without any further position-related difficulties. Any undesired deformation of the pour hole or the pour holes can therefore be specifically counteracted. Segmenting the pour hole can also contribute decisively toward preventing a pet from placing its head in a bag and thereby risking its life, for example. In order to avoid hazardous situations with pets as far as possible, the pour-hole film strip can preferably be used in the side gusset of the bag.

Further particularly advantageous embodiments and further developments of the invention are obtained from the dependent claims and the following description. The advantages specified in connection with the method of manufacture also apply to the subject matter of the use or for the product produced.

In the method of manufacture, any type of position finding can be used for the position of the pull tab and the corresponding positioning of the pour-hole film strip. In one preferred embodiment, however, it has provided to be particularly advantageous if a print control mark is provided on the film web, which is provided outside the pull tab. The production machine can orient itself by this print control mark both when producing the pull tab at the pull tab position and also during the subsequent application of the pour-hole film strip and during further subsequent processing steps because this print control mark is always visible. Such a print control mark is a visually identifiable marking which serves as a reference point inside the packaging film to be produced.

According to a preferred embodiment of the invention, in the process step of producing the first material weakening the film web is cut through in a starting region of the pull tab so that this starting region exposed by the cut can be simply gripped by a user of a bag produced using this packaging film, e.g. between his index finger and his thumb in order to subsequently tear the pull tab from the structure of the packaging film.

In this connection, according to a further aspect of the invention in connection with the process step of producing the first material weakening, a perforation of the film web is provided between a starting region and an end region of the pull tab. The perforation is in this case made in such a manner that in the event of said tearing at the pull tab, a break in the packaging film is made along substantially parallel-running perforation lines, which define the width of the pull tab. The perforation of the film web ends in the end region of the pull tab running substantially transversely to the perforation lines so that the end region stays connected to the film web and can virtually function as a hinge about which the pull tab pulled out from the combination of packaging films can be pivoted.

The pour-hole film strip can be supplied in many ways. For example, pour-hole film strips stacked one above the other can be supplied from above onto a film web which is spread out flat. However, it has proved to be particularly advantageous if the pour-hole film strip is provided with the aid of a pour-hole film strip tape. The layer structure of the tape is in this case typically formed by the layer structure of the pour-hole film strip so that no additional tape carrier layer is required. The pour-hole film tape was produced by all-over application of an adhesive to the carrier layer and application of the film strip sealing layer, i.e. by adhesive lamination. In this case, the process step of attaching comprises unrolling such a pour-hole film strip tape and separating the respective pour-hole film strip from the pour-hole film strip tape and subsequently punching the pour hole. The pour-hole film tape can, however, be produced in various other ways. For example, a coextruded film can be produced in a blow extrusion process, said film comprising a first polyethylene layer, which forms the film strip sealing layer and which has a hot-melting adhesive layer ("hotmelt") adjacent to and adjoining this, which forms the adhesive layer and which has a second polyethylene layer adjacent to and adjoining the adhesive layer, which has a protective function against undesired adhesion. The coextruded film constructed in this manner can be applied to the carrier film layer by solid adhesive lamination to the second polyethylene layer, with the result that a pour-hole film tape or ultimately a four-layer structure of the pour-hole film strip is formed.

According to a preferred exemplary embodiment, the pour-hole film strip separated from the tape is then further processed or positioned by lateral insertion in a transverse direction in relation to the running direction in the manufacturing process. The pour-hole tape blank then therefore covers the pull tab on the inner side of the packaging film to be produced. The positioning is preferably accomplished in register with the print control mark.

According to a further exemplary embodiment, a second material weakening can be provided in the pour-hole film strip. Said second material weakening can completely or partially surround the pour hole. For this purpose, the second material weakening runs at a distance from the pour hole so that said separating region is formed or defined between the second material weakening and the pour hole, which separating region can be detached from the combination of the pour-hole film strip by the action of the tensile force on this separating region. In order to be able to transmit the tensile force acting on the pull tab specifically into the adhesive layer of the pour-hole film strip, it is provided according to another aspect of the invention that the process step of attaching comprises a positioning of the pour-hole film strip so that the second material weakening in the pour-hole film strip runs congruently with the first material weakening in the film web in a seal-free region. The print control mark can again be used for the purpose of positioning.

In order to accomplish the function of the part of the reclosure provided with the aid of the pour-hole film strip in the packaging film, according to a further aspect of the invention, a sealing of the film strip sealing layer of the pour-hole film strip with the film inner side is provided in a first sealing region, wherein the first sealing region runs outside the pull tab around said pull tab and completely encloses said pull tab, and ultimately seals hermetically to the inner side of the packaging film. This first sealing region forms the mechanically permanent connection between the pour-hole film strip and the film web.

The reclosure which is ultimately to be actuated with the assistance of the pull tab is ultimately realized by sealing the film strip sealing layer of the pour-hole film strip with the film inner side in a second sealing region, wherein the second sealing region runs inside the pull tab around the pour hole. It is thus achieved that the tensile or compressive force exerted by a user on the pull tab can be correspondingly transferred to the part of the pour-hole film strip located thereunder. An easy access to the pour hole is thus achieved. On actuating the pull tab, a break is formed in the film strip sealing layer, which then exposes a region of the adhesive layer. At the same time, the aspect of the seal after the first opening of the reclosure of the packaging is taken into account by the completely circumferential second sealing region.

In order to optimize the introduction of force onto the second sealing region via the starting region of the pull tab, in a preferred exemplary embodiment of the invention it is provided that the seal at said starting region of the pull tab has a pointed shape, of which the point projects into the starting region of the pull tab or is directed toward this. It should be mentioned that a similar effect is also achieved by a round shape.

The two sealing regions can in principle be implemented successively. By this means it is provided according to a preferred embodiment of the method of manufacture that the sealing in the first sealing region and in the second sealing region is carried out simultaneously with a profile sealing tool, which on the one hand increases the processing rate during the manufacture of the packaging film and also the precision of the manufacture of both sealing regions.

To sum up, it should be mentioned that a packaging film can thus be produced, wherein by profile sealing the pour-hole film strip via a pre-perforated pull tab in the film web during manufacture, i.e. producing the two sealing regions on the one hand outside the pull tab and inside the pull tab, a packaging film is integrated on a horizontal bag machine before forming the sleeve in register with the print mark. The two congruently running material weakenings then so to speak meet in a region in which there is no seal, or more precisely in the non-sealed zone remaining between the two sealing regions. Pulling on the pull tab then transmits a break propagating in the first material weakening into the second material weakening and specifically via the second sealing region and opens the reclosure.

The invention will be explained again in detail hereinafter with reference to the appended figures using exemplary embodiments to which the invention is not, however, restricted. In this case, the same components in different figures are provided with identical reference numbers.

BRIEF DESCRIPTION OF THE FIGURES

In the figures:

FIG. 5 shows the detail in another configuration similarly to FIG. 3, FIGS. 6A to 6C show in schematic manner three embodiments of a pour-hole film strip with one pour hole according to the invention.

DESCRIPTION OF THE EXEMPLARY EMBODIMENTS

Figure 1:
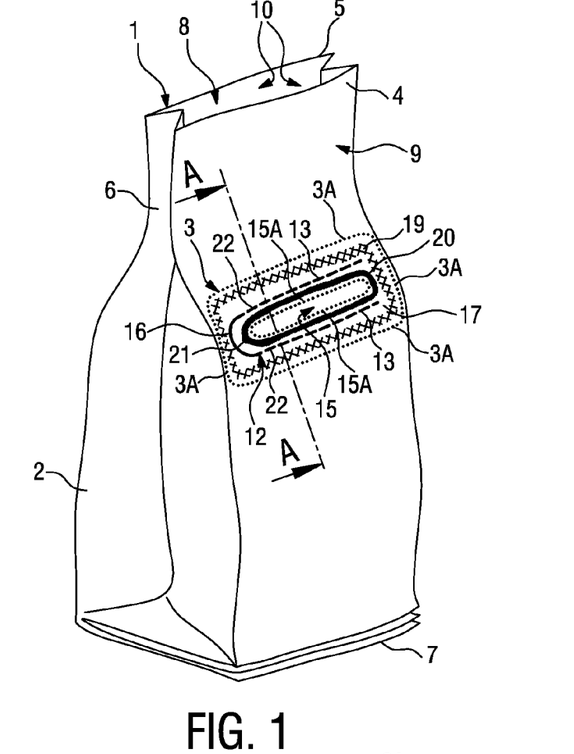
FIG. 1 shows in a schematic manner an exemplary embodiment of a bag according to the invention made from a packaging film according to the invention.

FIG. 1 shows a packaging according to the invention in the form of a flexible bag 1, which was made from a packaging film 2 on a bag making machine (not shown) by forming a sleeving. The bag 1 has a pour-hole film strip 3 which is delimited on its outer circumference by a film strip edge 3A. The bag 1 has a bag front side 4, a bag rear side 5 (not visible), a bag gusset 6, a bag base 7, and a top bag opening 8. The bag opening 8 is used for filling and is then permanently sealed. The packaging film 2 has a film outer side 9 and a film inner side 10, wherein the film inner side 10 is visible through the bag opening 8. During manufacture of the packaging film 2, the pour-hole film strip 3 was attached to that side of the packaging film 2, which forms the film inner side 10 of the bag.

The packaging film 2 used for the bag 1 is manufactured according to a method of manufacture for this packaging film 2 according to the invention, which comprises the following process steps.

Figure 2:
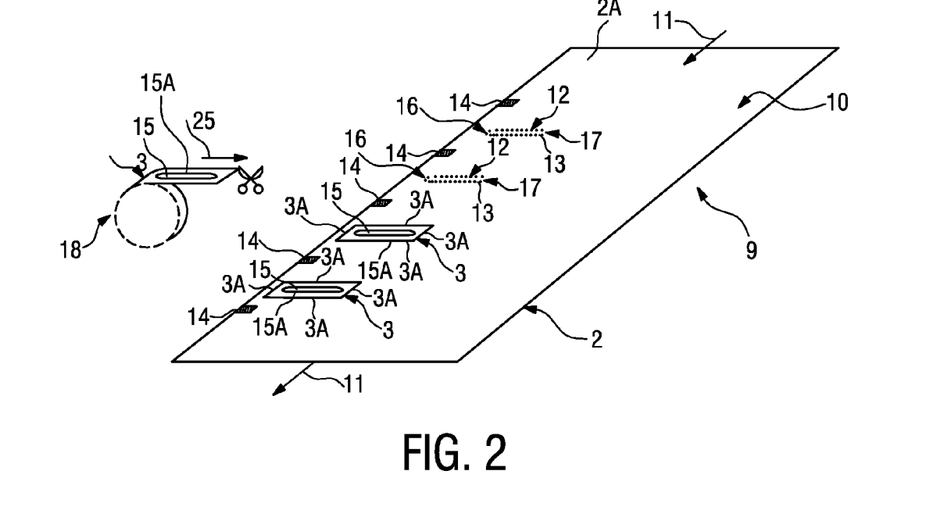
FIG. 2 shows in a schematic manner a method of manufacture according to the invention for the packaging film.

A film web 2A is initially supplied along a running direction 11, as shown in FIG. 2. When supplying the film web 2A, the film web 2A is substantially unrolled from a roll (not shown) and the unrolled film web 2A is transported flat in the running direction 11.

In a further process step, a first material weakening 13 defining a pull tab 12 in the film web 2A is produced at a pull tab position. In this case, the pull tab position is selected on the film web 2A in relation to a print control mark 14. In this case, the print control mark 14 serves as reference point or mark for the pull tab position. In technical language, the pull tab 12 is therefore produced "in register" with the print control mark 14.

The process step of producing the first material weakening 13 further comprises cutting through the film web 2A at a starting region 16 of the pull tab 12. In this case, substantially a semicircular or U-shaped cut is made in the film web 2A so that this arcuate or U-shaped region of the film web 2A forms a tab start which can be gripped as easily as possible by a user of the bag 1. The process step of producing the first material weakening 13 further comprises perforating the film web 2A between the starting region 16, i.e. adjacent to the aforementioned cut, and an end region 17 of the pull tab 12. During the perforating, relatively closely spaced dash-like incisions are made in the film web 2A which penetrate the thickness of the film web 2A. These incisions extend substantially from the end regions of the arcuate or U-shaped incision in the starting region 16 as far as the end region 17, wherein in the end region 17 between the linear perforation of the film web 2A, no further material weakening is provided to end a tearing of the pull tab 12 at this end region 17. The end region 17 forms a structural unit with the packaging film 2 and thus allow the pull tab 12 to be reliably folded up and folded back, similarly to a hinge.

In a further process step, a pour-hole film strip 3 is supplied. The process step of supplying the pour-hole film strip 3 comprises initially unrolling a pour-hole film strip tape 18 and punching a pour hole 15 and producing a second material weakening 22 and separating the pour-hole film strip 3 from the pour-hole film strip tape 18. The second material weakening 22 can be produced in a similar manner to the first material weakening 13. The separated pour-hole film strip 3 is inserted laterally in relation to the running direction 11 of the film web 2A, the insertion taking place substantially in a transverse direction 25 in relation to the running direction 11.

In the present case, the pour-hole film strip 3 has a three-layer structure which is explained subsequently in the context of FIGS. 3, 4, and 5. The three-layer structure defines the pour hole 15 along a pour hole edge 15A. The three-layer structure has a film strip sealing layer 23 and an adhesive layer 24 situated adjacent to, and directly adjoining, the film strip sealing layer 23 and a carrier film layer 25 situated adjacent to, and directly adjoining, the adhesive layer 24 on the side of the adhesive layer 24 facing away from the film strip sealing layer 23. The pour-hole film strip 3 further has the second material weakening 22 completely surrounding the pour hole 15 in the present case, which second material weakening 22 is however only formed in the film strip sealing layer 23. A course of the second material weakening 22 therefore defines an outer edge of a separating region in the film strip sealing layer 23. The separating region is therefore defined on the one hand by the pour hole 15 and on the other hand by the second material weakening 22. The film strip sealing layer 23 realizes a predetermined breaking layer, from which the separating region can be released by the action of a tensile force.

In a further process step, the pour-hole film strip 3 is attached at the pull tab position on that side of the film web 2A which, when the packaging film 2 is used as prescribed, forms the film inner side 10 of the packaging 2. In this case, the pour-hole film strip 3 is positioned in such a manner that the second material weakening 22 in the pour-hole film strip 3 runs substantially congruently with the first material weakening 13 in the packaging film 2, i.e. the shape or extension of the pour hole 18 substantially corresponds to the shape or extension of the pull tab 12. Said print control mark 14 is again used for positioning.

After the positioning, the film strip sealing layer 23 of the pour-hole film strip 3 is sealed with the film inner side 10 in a first sealing region 19, the first sealing region 19 running outside the pull tab 12 around the pull tab 12 and completely enclosing this, as shown in detail in FIG. 1. To clarify the facts of the matter shown in FIG. 1, it should be noted at this point that, as mentioned initially, the pour-hole film strip 3 is positioned on the inner side 10 of the packaging film. For the sake of clarity, in addition to the outwardly visible perforation of the pull tab 12, the most important structural boundaries of the pour-hole film strip 3 and their joining zones with the packaging film 2 are shown visibly even if this were not possible in reality when viewed from outside.

The process step of attaching further comprises a sealing of the film strip sealing layer 23 of the pour-hole film strip 3 with the film inner side 10 in the second sealing region 20, the second sealing region 20 inside the pull tab 12 running around the pour hole 15 and completely enclosing this. The sealing in the second sealing region 20 is accomplished in such a manner that substantially along the longitudinal extension of the pull tab 12 there exist parallel sealing zones, which are connected at the end region 17 of the pull tab 12 by a straight sealing line as shown in FIG. 4. In contrast, the seal in the second sealing zone 20 has a pointed shape 20 at the starting region 16 of the pull tab 12, which promotes the introduction of force into the predetermined breaking layer when tearing the pull tab 12.

The sealing in the first sealing region 19 and in the second sealing region 20 is accomplished simultaneously with a profile sealing tool, which through its profile defines the shape of the first sealing region 19 and the second sealing region 20.

Figure 3:
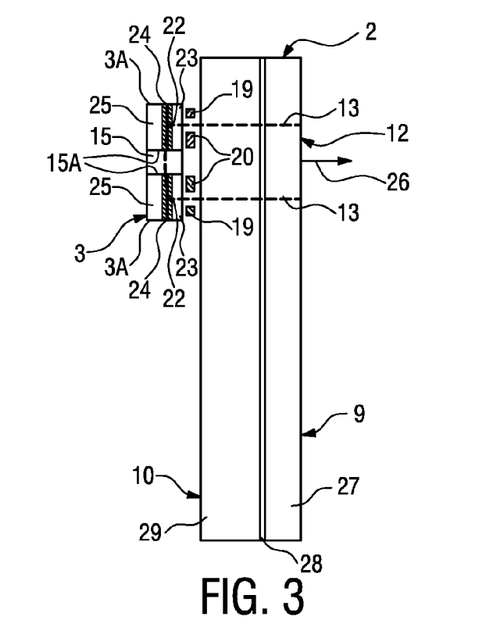
FIG. 3 shows an exploded view of a detail of the packaging film of the bag according to FIG. 1 along a section A-A.

The configuration present after positioning and attaching the pour-hole film strip 3 is shown in detail in FIG. 3, which reproduces a section along the line of intersection A-A in FIG. 1 in an exploded view. The combined structure of film web 2A and pour-hole film strip 3 produced by sealing is therefore shown detached from one another in FIG. 3 in order to better illustrate the position and structural relationships.

The pour-hole film strip 3 shown in the section A-A in FIG. 3 shows the three-layer structure exhibited by the centrally situated elongate and substantially rectangularly configured pour hole 15. The three-layer structure consists of the film strip sealing layer 23, which is facing a packaging film sealing layer 29, i.e. the subsequent film inner side 10 of the packaging film 2. Adjacent to the film strip sealing layer 23, the pour-hole film strip 3 has the adhesive layer 24. Adjacent to the adhesive layer 24 it is possible to see the carrier film layer 25 on the side of the adhesive layer 24 facing away from the film strip sealing layer 23. The pour-hole film strip 3 further comprises said second material weakening 22 which encloses the entire pour hole 15 at a distance from the pour hole 15. In the direction of the thickness of the pour-hole film strip 3, the second material weakening 22 in the form of a perforation completely penetrates the film strip sealing layer 23.

Shown schematically in a region between the pour-hole film strip 3 and the packaging film 2 are the first sealing region 19 which, as mentioned, completely surrounds the pull tab 12, and the second sealing region 20, which as mentioned completely surrounds the pour hole 15. In these two sealing regions 19 and 20, the film strip sealing layer 23 is sealed with the packaging film sealing layer 29, as mentioned, by profile sealing. In this case, a fusion of the material of the film strip sealing layer 23 with the material of the packaging film sealing layer 29 takes place inside the sealing regions 19 and 20, which is illustrated in the present case by structural elements released from the packaging film, i.e. the material zones of the sealing regions 19 and 20, although these structural elements rather represent an integration of the film strip sealing layer 23 with the packaging film sealing layer 29.

That region of the packaging film 2 which has the first material weakening 13 and that region of the film strip sealing layer 23 which has the second material weakening 22 are not sealed. The congruent positioning of both material weakenings 13 and 22 can be clearly seen.

Figure 4:
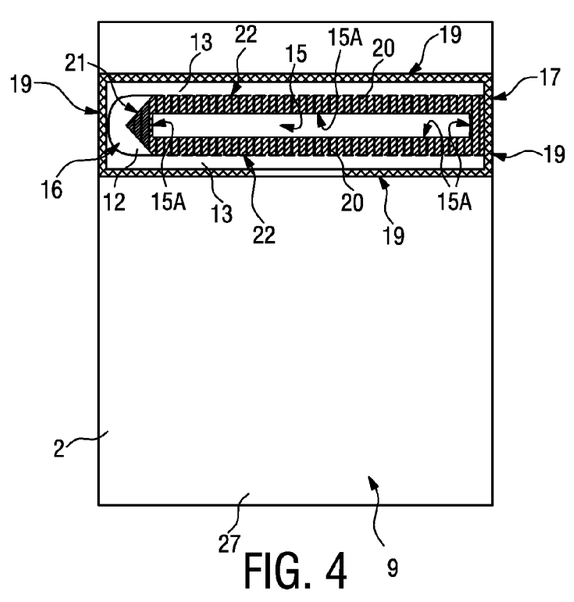
FIG. 4 shows a frontal view of the detail of the packaging film from FIG. 3.
Figure 5:
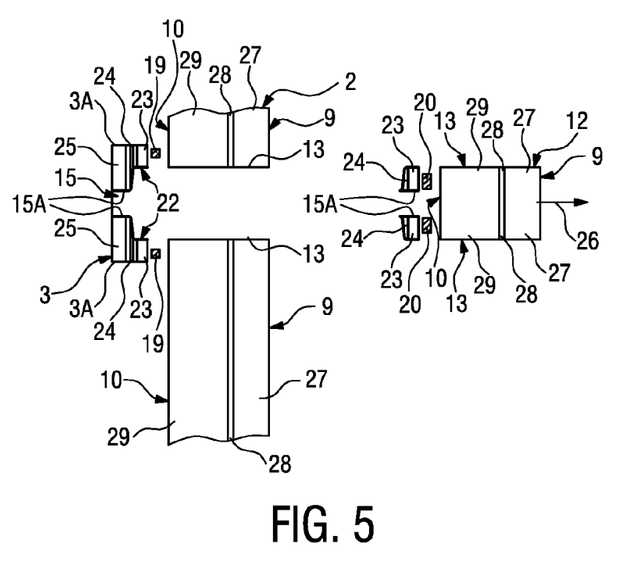

The packaging film 2 shown in FIG. 3 further comprises a carrier material layer 27, whose outer side forms the film outer side 9 (cf. FIG. 4). Located between the packaging film sealing layer 29 and the carrier material layer 27 is a layer of solid adhesive 28 which inseparably connects the carrier material layer 27 to the packaging film sealing layer 29. For clarity the configuration shown in FIG. 3 is shown in FIG. 4 viewed from the outer side of the bag 1, although a "transparent view" through the structure is given. With regard to the materials used, it should be mentioned at this point as an example that the packaging film sealing layer 29 can be made of a low density polyethylene (LDP) or from a blend of LDP and linear low density polyethylene (LLDP). To promote the tearing property, medium density polyethylene (MDPL) can preferably be added in both cases. The solid adhesive 28 can, for example, be formed from polyurethane, polyester, and polyether-based solvent-free two-component adhesive. Transparent polyester having a thickness of 12 μm (PET 12) or metalized polyester having a thickness of 12 μm (METPET 12), for example, can be used for the carrier material layer 27.

A combination of an outer paper layer having a thickness of, for example, 60-90 g/m² and said METPET 12 could also be used.

Due to the previously described attachment of the pour-hole film strip 3 to the processed film web 2A, a part of the film strip sealing layer 23 between the pour hole 15 and the second material weakening 22 and the adjoining region of the adhesive layer 24 forms a reclosure cooperating with the pull tab 12, which will be discussed in detail hereinafter with reference to FIG. 5. FIG. 5 shows the structure shown in FIG. 3 with the pull tab 12 opened.

The pull tab 12 is opened by tearing at the pull tab 12 beginning at the starting region 16 and specifically in a tearing direction 26, as shown by an arrow in FIG. 3. By tearing at the pull tab 12 in the tearing direction 26, the packaging film 2 breaks open along the first material weakening 13. However, since the packaging film sealing layer 29 with the film strip sealing layer 23 is firmly (inseparably) sealed inside the second sealing region 20, this break continues through the packaging film 2 into the film strip sealing layer 23 and there spreads along the second material weakening 22 in the film strip sealing layer 23, whereby at the same time the region of the film strip sealing layer 23 defined by the second material weakening 22 is torn away or separated from the adhesive layer 24. In this case, the adhesive stays adhering to the carrier film layer 25 and also to the separated region of the film strip sealing layer 23. Following the first opening of the pull tab 12, this allows said pull tab to be pressed into the opening thus formed again and the adhesive-covered regions of the film strip sealing layer 23 and the carrier film layer 25 adhere to one another. The process of opening and closing can thus be repeated many times, with a reliable sealing of the opening being achieved again and again with the aid of the adhesive.

Figure 6A:
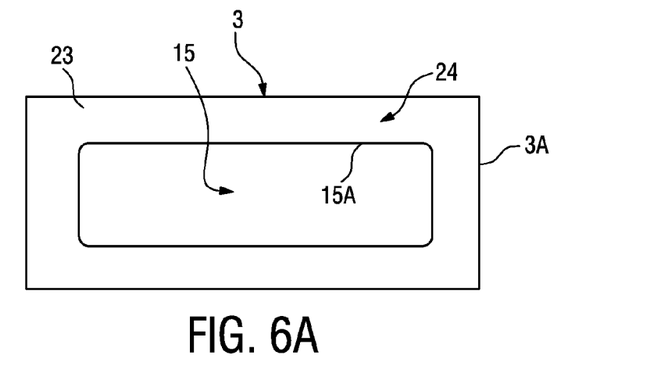
Figure 6B:
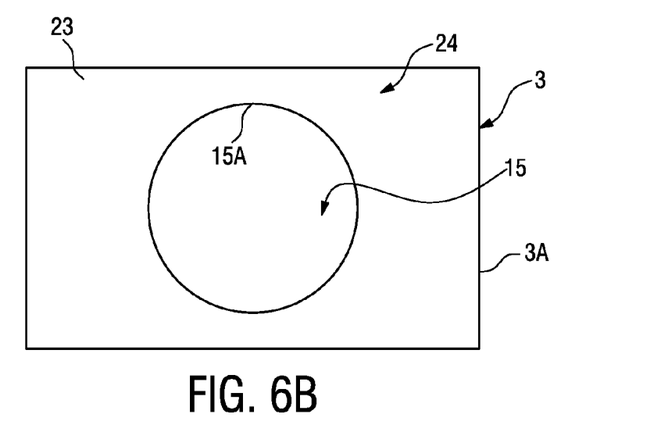
Figure 6C:
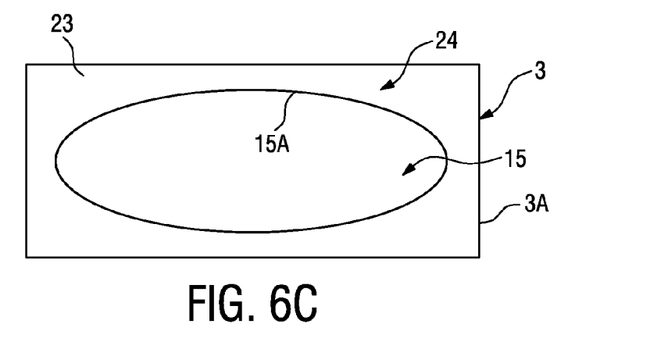
Figure 7A:
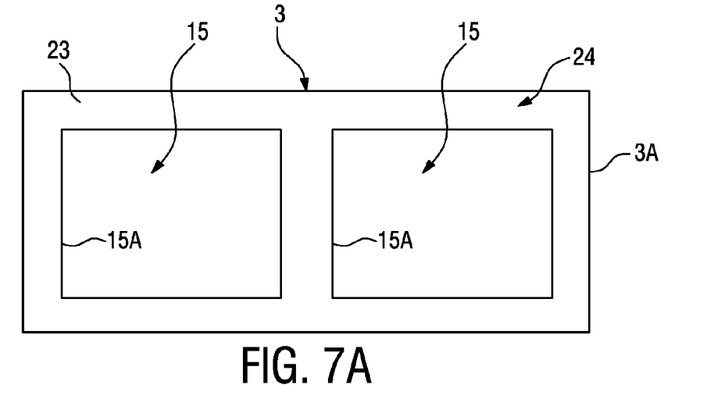
FIGS. 7A to 7C show three pour-hole film strips with two pour holes in similar manner to FIGS. 6A to 6C.
Figure 7B:
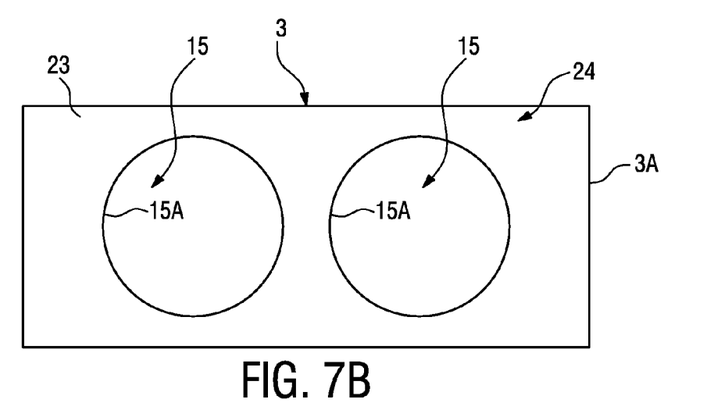
Figure 7C:
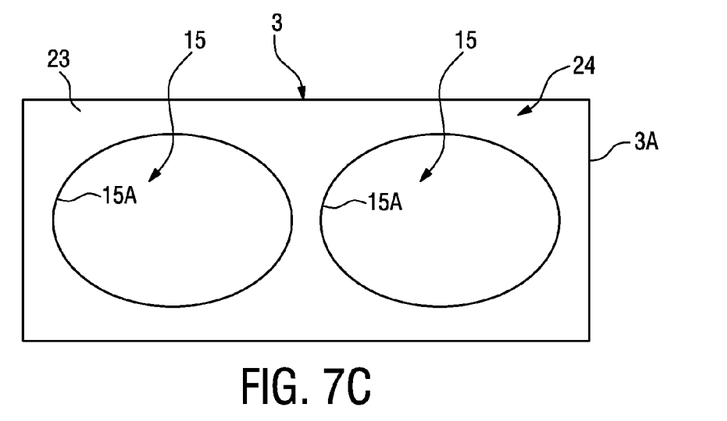

In order to obtain an increased stiffness in the packaging film 2 in the area of the reclosure, the shape of the pour-hole film strip 3 can be differently configured. Thus, for example, FIGS. 6A to 6C show different pour-hole film strips 3 which have a single pour hole 15 as a common feature. For the pour-hole film strip 3 shown in FIG. 6A, the shape of the single pour hole 15 can be described as substantially rectangular with slightly rounded corners. The pour hole 15 shown in FIG. 6B, on the other hand, has a circular shape whereas the pour hole 15 shown in FIG. 6C has an elliptic shape. The shaping of the pour hole 15 can be determined on the one hand by the goods to be removed or their portionability. In addition, on the other hand the shaping of the pour hole 15—and ultimately the size ratio between the dimension of the pour hole 15 and the dimension of the pour-hole film strip 3—also enables the torsional stiffness of the packaging film 2 in the area of the reclosure to be influenced. For example, if it is required that the structure in the area of the reclosure should be as stiff as possible, it is then advantageous to use the pour-hole film strips 3 shown in FIGS. 7A-7C because these additionally have a structure-reinforcing web 31 in addition to the previously described properties or features. Due to the, for example, centrally designed web 31, these pour-hole film strips 3 each have two pour holes 15. Both the shape of the pour holes 15 and the size or size ratio of the two pour holes 15 to one another can fundamentally be selected in a wide range and according to the formulation of the problem. The number of webs 31 can also be more than 2, for example, 3, 4 or even 10. Also the orientation of the webs need not be uniform and said webs 31 can also cross one another. In FIGS. 6A to 6C and in FIGS. 7A to 7C, the pour-hole film strips 3 are shown with the viewing direction onto the side of the film strip sealing layer 23. The all-over adhesive layer 24 under the film strip sealing layer 23 is merely indicated schematically.

According to a preferred exemplary embodiment, the second material weakening 22 is omitted. The separating region is thus formed between the edge (pour hole edge 15A) of the pour hole 15 and the edge of the second sealing region 20 most remote from the pour hole 15 and then does not run at a distance from the outer edge of the second sealing region 20 as shown in FIG. 3 or 5 but substantially in alignment with this. This embodiment is particularly preferred when the film strip sealing layer 23 is of the "easy tear" type, that is, forms the relatively thin predetermined breaking layer. Then, the tearing of the film strip sealing layer 23 can begin above the pointed shape 21 of the second sealing region 20 and specifically without an additional material weakening being required in the film strip sealing layer 23. During a further tearing at the pull tab 12 the break then propagates through the film strip sealing layer 23 along the outer edge of the second sealing region and the separating region is separated flat from the pour-hole film strip 3 and specifically as far as the end region 17 where this process ends.

Even if the pour-hole film strip 3 was aligned transversely to the bag front side 4 of the running direction 11 in the previously described exemplary embodiment, it should be mentioned at this point that the alignment can also differ from this and can have any direction. Also the pour-hole film strip 3 can be positioned on the bag rear side. Equally well, the pour-hole film strip 3 can also be localized in the bag gusset 5. The same applies as appropriate for the pull tab 12.

It is finally noted once again that the method described previously in detail or the device merely comprise exemplary embodiments which can be modified by the person skilled in the art in various ways, without departing from the scope of the invention. For the sake of completeness, however, that the use of the indefinite article "a" or "one" does not exclude the fact that the relevant features can also be multiply present. Likewise the terms "zone", "region", "material weakening", "packaging film etc. or their context-related use do not exclude the fact that these consist of a plurality of individual zones or regions, which can optionally also be spatially distributed.

The invention claimed is:

1. Method of manufacture for a packaging film, comprising the following process steps:
supplying a film web along a running direction and
producing a first material weakening defining a pull tab in the film web at a pull tab position, and
supplying a pour-hole film strip, which pour-hole film strip has at least a three-layer structure, wherein the at least three-layer structure defines at least one pour hole and wherein the at least three-layer structure comprises a film strip sealing layer and an adhesive layer situated adjacent to the film strip sealing layer, and a carrier film layer situated adjacent to the adhesive layer on the side of the adhesive layer facing away from the film strip sealing layer, wherein the film strip sealing layer realizes a predetermined breaking layer, which is constituted in such a manner that under the action of a tensile force on a separating region of this predetermined breaking layer at least partially surrounding the pour hole, a break propagates along an edge of the separating region in the predetermined breaking layer and
attaching the pour-hole film strip with the film strip sealing layer to that side of the film web, which, when the packaging film is used to form a packaging, forms a film inner side of the packaging so that said action of tensile force can be transmitted via the pull tab to the separating region and said separating region and the adjoining region of the adhesive layer form a reclosure cooperating with the pull tab.

2. The method of manufacture according to claim 1, wherein the process step of producing the pull tab comprises selecting the pull tab position in relation to a print control mark on the film web.

3. The method of manufacture according to claim 1, wherein the process step of producing the first material weakening comprises cutting through the film web in a starting region of the pull tab.

4. The method of manufacture according to claim 1, wherein the process step of producing the first material weakening comprises perforating the film web between a starting region and an end region of the pull tab.

5. The method of manufacture according to claim 1, wherein the process step of supplying the pour-hole film strip comprises unrolling a pour-hole film strip tape and punching a pour hole and separating the pour-hole film strip from the pour-hole film strip tape.

6. The method of manufacture according to claim 1, wherein the process step of supplying the pour-hole film strip comprises laterally inserting the pour-hole film strip in a transverse direction in relation to the running direction.

7. The method of manufacture according to claim 1, wherein the process step of attaching comprises positioning the pour-hole film strip in relation to a print control mark so that a second material weakening in the pour-hole film strip, which at least partially surrounds the pour hole and is formed in relation to the adhesive layer in the region of the at least three-layer structure facing the film strip sealing layer, runs congruently with the first material weakening.

8. The method of manufacture according to claim 1, wherein the process step of attaching comprises sealing the film strip sealing layer of the pour-hole film strip with the film inner side in a first sealing region, wherein the first sealing region runs outside the pull tab around said pull tab and completely encloses said pull tab.

9. The method of manufacture according to claim 1, wherein the process step of attaching comprises sealing the film strip sealing layer of the pour-hole film strip with the film inner side in a second sealing region, wherein the second sealing region runs inside the pull tab around the pour hole.

10. The method of manufacture according to claim 9, wherein the sealing in the second sealing region is effected in such a manner that the seal has a pointed shape at a starting region of the pull tab.

11. The method of manufacture according to any one of claims 8, 9 and 10, wherein the sealing in the first sealing region and in the second sealing region is carried out simultaneously with a profile sealing tool.

* * * * *